(12) United States Patent
Schopf et al.

(10) Patent No.: US 7,748,209 B1
(45) Date of Patent: Jul. 6, 2010

(54) SMALL SINGLE USE GAS TURBINE ENGINE WITH OIL-LESS BEARING ARRANGEMENT

(75) Inventors: Cheryl A. Schopf, Jupiter, FL (US); Jack W. Wilson, Jr., Palm Beach Gardens, FL (US); Wesley Brown, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 796 days.

(21) Appl. No.: 11/636,273

(22) Filed: Dec. 8, 2006

(51) Int. Cl.
*F02C 7/06* (2006.01)
(52) U.S. Cl. .................................................. 60/39.08
(58) Field of Classification Search ................ 60/39.08, 60/226.1, 772, 782, 785, 792, 806
See application file for complete search history.

(56) References Cited

U.S. PATENT DOCUMENTS

| | | | |
|---|---|---|---|
| 3,078,667 A | 2/1963 | Deinhardt | |
| 3,200,580 A | 8/1965 | Millar | |
| 3,756,672 A | 9/1973 | Hibner et al | |
| 4,080,783 A | 3/1978 | Hamburg et al. | |
| 4,497,172 A * | 2/1985 | Smith | 60/226.1 |
| 4,561,246 A | 12/1985 | Hovan | |
| 4,599,862 A | 7/1986 | Bergeron | |
| 5,526,640 A | 6/1996 | Brooks et al. | |
| 6,035,627 A * | 3/2000 | Liu | 60/785 |
| 6,161,768 A * | 12/2000 | Gordon et al. | 237/12.1 |
| 7,021,042 B2 | 4/2006 | Law | |
| 2004/0025495 A1 * | 2/2004 | Dev | 60/226.1 |

* cited by examiner

*Primary Examiner*—Michael Cuff
*Assistant Examiner*—Andrew Nguyen
(74) *Attorney, Agent, or Firm*—John Ryznic

(57) ABSTRACT

A small single use gas turbine engine with a twin spool rotor shaft and a bypass fan, the rotor shafts being supported for rotation by bearings in the front and rear compartments of the engine. A portion of the bypass fan air is diverted to flow through the bearings in order to provide for cooling of the high speed bearings. Because a large amount of cooling air is required to cool the bearings, an air in tube is positioned in each of the guide vanes in the turbine section to provide for a cooling air passage leading into the rear bearings. In the front bearings, cooling air from the bypass fan is bled off from a location just upstream from the entrance to the centrifugal compressor. A fuel mist tube supplies fuel mist to the cooling air before passing through the bearings to provide extra cooling for the bearings and to provide lubrication to improve the service life of the engine. Because the cooling air is supplied by the bypass fan, the pressure is high enough and the volume is large enough to provide adequate cooling for the high rotational speed bearings used in such a small and high rotating gas turbine engine.

17 Claims, 2 Drawing Sheets

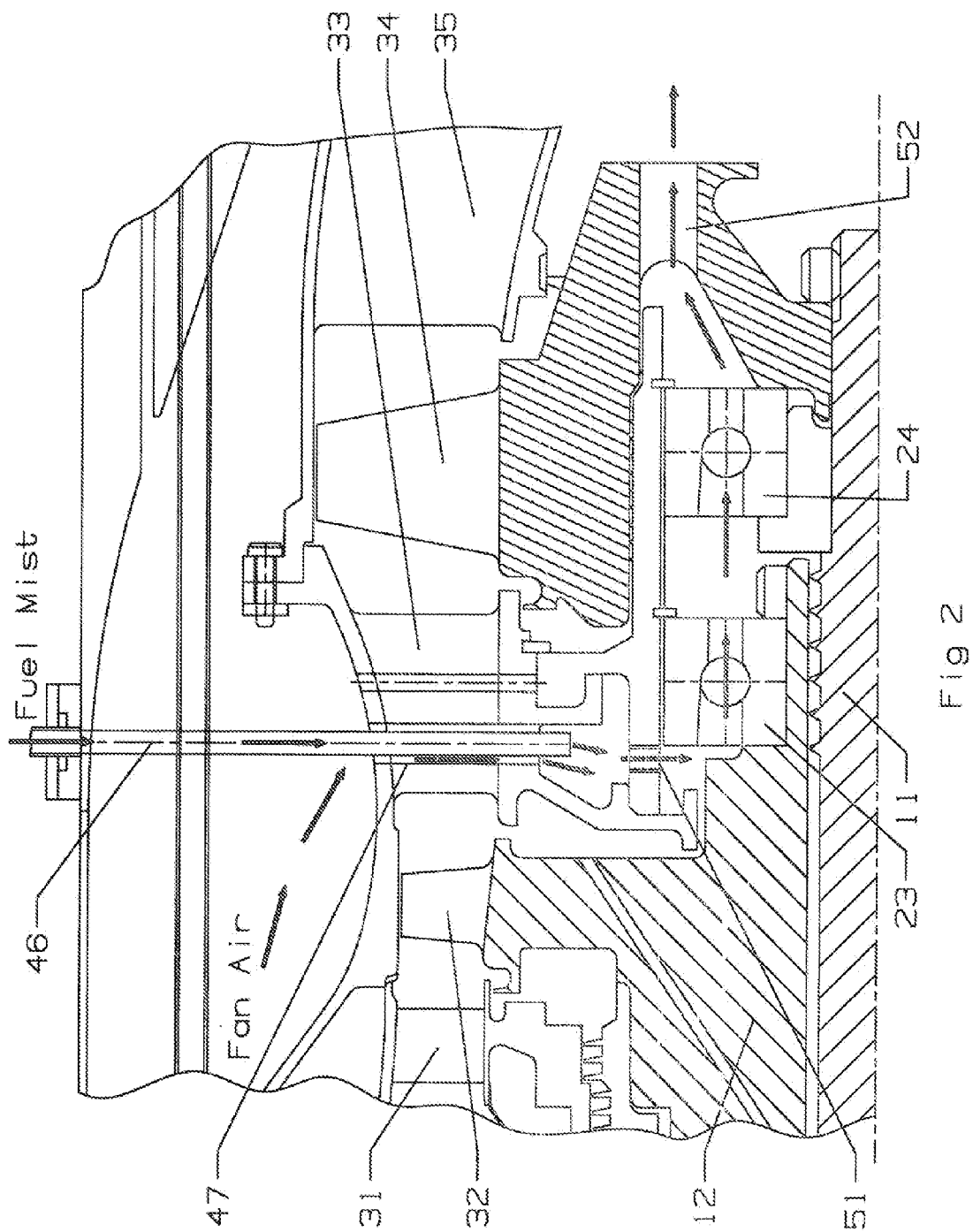

SMALL SINGLE USE GAS TURBINE ENGINE WITH OIL-LESS BEARING ARRANGEMENT

CROSS-REFERENCE TO RELATED APPLICATIONS

This application is related to U.S. Regular patent application Ser. No. 11/219,617 filed on Sep. 3, 2005 and entitled GAS TURBINE ENGINE WITH AN AIR COOLED BEARING.

BACKGROUND OF THE INVENTION

1. Field of the Invention

The present invention relates generally to a gas turbine engine, and more specifically to a small single use gas turbine engine with oil-less bearings.

2. Description of the Related Art Including Information Disclosed Under 37 CFR 1.97 and 1.98

A gas turbine engine is a very efficient machine for converting energy contained in a fuel into mechanical energy used to drive a generator or propel an aircraft. In an industrial gas turbine engine (IGT), weight is not an issue so the engine can be large and heavy. The most important factor in an IGT is the overall engine efficiency. Combined cycle gas turbine engines are used to improve the efficiency of the engine. In an aero engine used to propel an aircraft, weight is an important factor. Higher engine performance is exchanged for lighter weight. In both of these engines, another major factor is making these engines have a long life period. The longer an engine can last, the lower becomes the overall cost of purchasing the engine.

Recently, single use gas turbine engines have been used to power unmanned aero vehicles (UAV) such as a cruise missile or an aero drone. In a cruise missile, the engine is used only once for obvious reasons and has a very short life time of about one hour. In an aero drone such as that used for video observation, size, weight, and hover time are the most important factors. The engine is used once and for a short time period until the fuel is used up. The hover time is the time that the aircraft can be flown over the intended target. The longer the time, the lower the number of aircraft needed.

In these UAVs, the engine is small in the order to a few hundred pounds thrust or less. At this small size, the rotor shaft must rotate at very high rotational speeds in order for the performance of the engine to be efficiency enough for use in these aircrafts. In a normal gas turbine engine (non-single use engines) the rotor shaft is supported by bearings that can be cooled by passing a lubricant through the bearings. With this type of bearing lubrication system, an oil reservoir tank is required as well as an oil pump, an oil filter, a lubrication system and other parts to provide a fully functioning bearing lubrication system for the engine. This lubrication is not a major problem for use in the larger and multiple use engines. However, for a single use and small engine, a separate bearing lubrication system would add a significant amount of weight, size and complexity to the little engine. Space is limited in a small aircraft such as a cruise missile or drone. Any additional weight added to the aircraft means that less fuel can be carried, and therefore the hover time is reduced. If the bearings can be cooled and lubricated without the need of a separate bearing lubrication system, then extra fuel can be accommodated on the aircraft and the hover time can be increased. Without adequate bearing cooling, a small gas turbine engine that operates at very high rotational speeds will burn up the bearings very quickly. Therefore, a small UAV powered by a small gas turbine engine is not practical using prior art technologies.

It is therefore an object of the present invention to provide for a small gas turbine engine that is used for a single flight in which the bearings can be adequately cooled and lubricated without the use of a separate bearing lubrication system in order to reduce the weight and size of the engine.

BRIEF SUMMARY OF THE INVENTION

The present invention is a small single use twin spool gas turbine engine with a bypass fan that includes a bearing assembly to rotatably support the rotor shaft. The front and rear bearings are cooled by passing compressed air that is bled off from the bypass fan through the bearings. To properly cool the bearings, about 5% of the total fan bypass air is bled off and passed through the bearings. The bearing cooling air is passed through stationary vanes, and can be mixed with a fuel mist to increase the cooling capability of the air flow through the bearings. The fuel mist will also provide lubrication to the bearings. In the front bearing assembly, the cooling air is drawn out from the bearings by a vacuum pump. In the rear bearing assembly, the cooling air is passed out with the exhaust of the engine. Metal or O-ring dampers are used to provide damping to the bearings. The bearings are also coated with tungsten disulfide in order to add life to the bearings.

BRIEF DESCRIPTION OF THE SEVERAL VIEWS OF THE DRAWINGS

FIG. 2 is a schematic view of a rear section of the gas turbine engine with the rear bearing arrangement of the present invention.

DETAILED DESCRIPTION OF THE INVENTION

Figure 1:
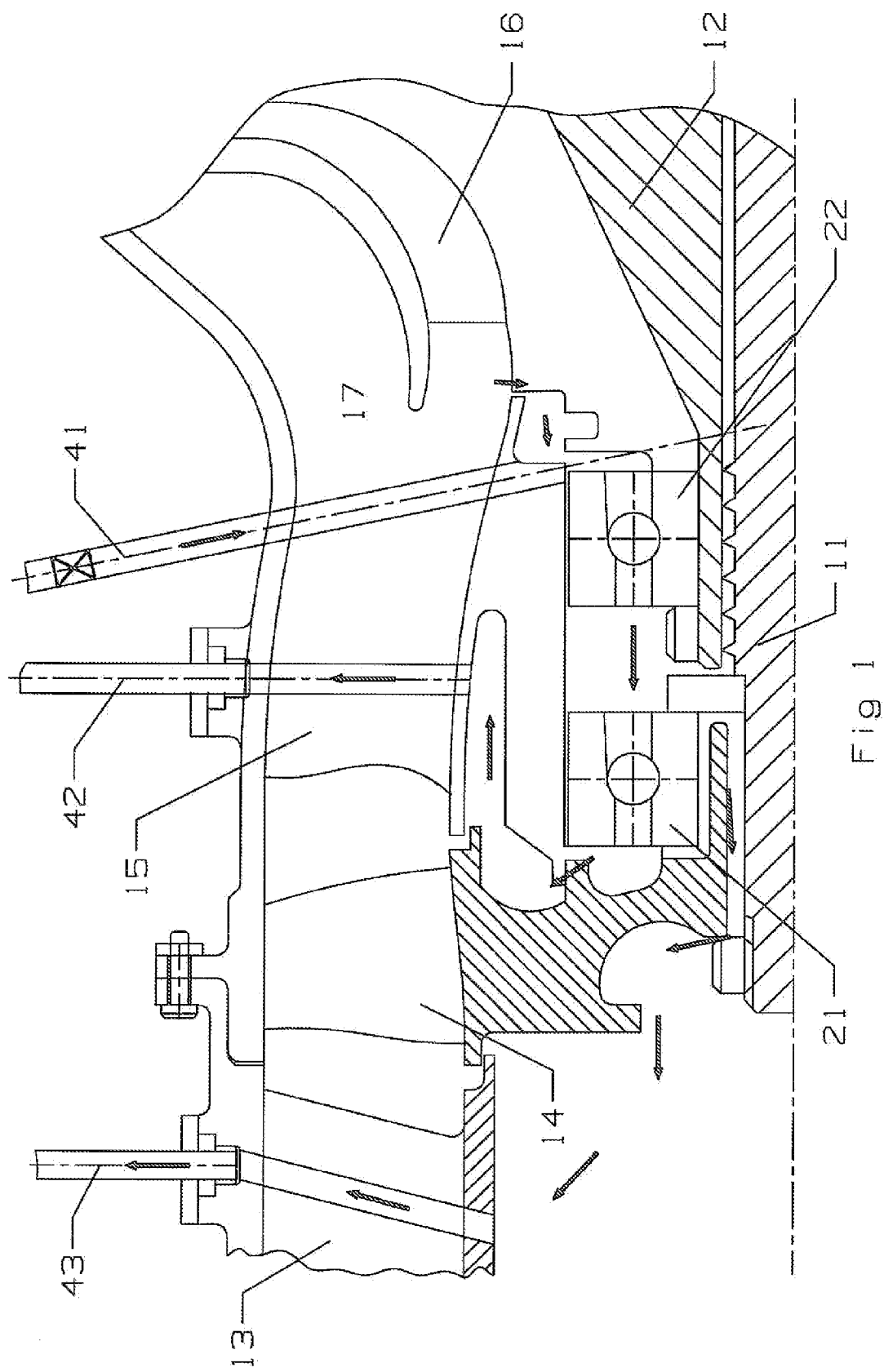
FIG. 1 is a schematic view of a front section of the gas turbine engine with the front bearing arrangement of the present invention.

The present invention is a small gas turbine engine that includes a twin spool rotor shafts with a bypass fan. The small engine is a single use engine intended for use in a cruise missile or observation drone in which the size and weight of the engine is a significant factor that contributes to the hover time for the aircraft.

FIG. 1 shows the front portion of the engine and includes an inner rotor shaft 11 and an outer rotor shaft 12. The inner rotor shaft rotatably supports a fan blade assembly 14, while the outer shaft 12 rotatably supports a centrifugal compressor 16. the inner rotor shaft 11 is rotatably supported by a first bearing assembly 21 which is supported by a stationary vane 15 positioned between the fan blade 14 and the centrifugal compressor 16 extending from the engine casing. The outer rotor shaft 12 is supported by a second bearing assembly 22 that is also supported by the stationary vane 15. A guide vane 13 is located upstream from the fan blade 14.

Compressed air from the bypass fan is bled off at a location just upstream from the entrance to the centrifugal compressor 16 and passed through the second bearing assembly 2 and then through the first bearing assembly to provide cooling for these two bearing assemblies. The centrifugal compressor assembly and the bearing support assemblies are annular in configuration. A plurality of the cooling air bleed off passages is used in order to provide enough air flow through the bearings.

A fuel mist tube 41 is also used to cool the bearings and add a lubricant to extend the life of the bearings. A single fuel mist tube 41 is used and is located between the second stage guide vane 15 and the centrifugal compressor 16 and injects a mist of fuel at a location just upstream of the second bearing assembly 22 and into the cooling air flow that is bled off from the centrifugal compressor 16 inlet. A control valve is located in the fuel mist tube to regulate the amount of fuel mist injected into the bearing cooling air flow. The bearing cooling air and fuel mist is vacuumed out from the bearing assemblies through fuel mist out tube 42 located in the second stage guide vane 15 and air out tubes 43 located in the first guide vanes 13. An air out tube 43 is located in each of the guide vanes used in the engine in order to provide enough air flow for cooling the bearings. A single fuel mist out tube 42 is needed to remove the fuel mist from the cooling air, but more than one tube can be used if the volume of fuel is large enough. A vacuum pump is used to suck the cooling air and fuel mist through the air out and fuel mist out tubes. The bearings 21 and 22 are each supported by Kalrez brand O-rings that provide damping to the bearings. The fuel mist tube and vacuum pump can be eliminated. Also, the forward bearing flow may also be purged through the inlet struts or nosecone of the engine instead of through the air out tube as shown in FIG. 1.

FIG. 1 shows the forward bearing cooling and lubricating flow. The cooling air from the bypass fan flow and the fuel mist are injected upstream of the two bearings and flow through the two bearing toward the front end of the engine. When the air and fuel mist pass out from the first bearing, some of the fuel will make contact with the rotor disk of the fan blade 14 and be centrifugally forced upward and into the space below the guide vane 15 in which the tube 42 is connected. The remaining fuel mist is carried out the front with the cooling air and into the air out tube 43.

FIG. 2 shows the rear section of the engine with the bearing assemblies that support the two rotor shafts at the rear end. The outer rotor shaft 12 is supported by a third bearing assembly 23 and the inner rotor shaft 11 is supported by a fourth bearing assembly 24. Both of the bearing assemblies 23 and 24 in the rear of the engine are supported by an extension of the second stage stator vanes 33 used in the turbine section of the engine. A first stage guide vane or nozzle 31 is located just downstream from a combustor (not shown) to direct the hot gas flow into a first stage rotor blade 32 that is rotatably connected to the outer rotor shaft 12. A second stage or low pressure turbine blade 34 is located downstream from the second stage stator vane 33 and is rotatably connected to the inner rotor shaft 11. In the embodiment of the present invention, 18 second stage guide vanes 33 are used and 29 second stage rotor blades 34 are used in the engine. Rear exhaust struts 35 extend from the outer casing and are located downstream from the turbine. In this embodiment, there are seven of these struts 35. The bearings 23 and 24 are supported by metal dampers.

In the rear engine section shown in FIG. 2, a cooling air supply tube 47 is located in each of the 18 second stage guide vanes to supply cooling air into the bearings that support the rotor shafts in the rear section. the air in tubes 47 are connected to the bypass air flow from the bypass fan and channel a portion of the bypass air into the air in tubes 47 and through the third bearing assembly 23 and then through the fourth bearing assembly 24 before being discharged through a plurality of holes 52 formed in the second stage turbine blade disk and out the engine to be mixed with the engine exhaust. In one of these air in tubes 47 is inserted a fuel mist tube 46 that delivers a fuel mist to be mixed with the cooling air and passed through the bearings 23 and 24 to provide lubrication to these bearings as in the FIG. 1 bearing lubrication. Cooling air from the bypass flow for the fan 14 flows into the 17 air in tubes 47, through a number of holes 51 formed in the bearing support extension of the second stage vane 33, through the third bearing 23, through the fourth bearing 24, out the holes 52 in the second stage rotor blade disk, and then merge with the exhaust of the engine.

The bearing arrangement of the present invention provides for rotational support of a twin spool small gas turbine engine that rotates above 100,000 rpms. The air cooling is bleed off air from the bypass fan rotatably secured to the inner spool. The amount of cooling air required to provide enough cooling for the bearings is about 4% to 5% of the air entering the fan 14. In order that this amount of cooling air can be passed through the bearings, enough air in tubes is used. The bypass fan compresses the air enough to provide pressurized air that will flow through the bearings with enough velocity to provide cooling. In the engine rear compartment, all of the stator vanes include an air in tube 47. In this embodiment, there are 18 second stage vanes 33 each with an air in tube 47 extending through the vane. Only one of these air in tubes 47 is used to pass through the fuel mist tube 46, while the remaining 17 air in tubes 47 are used to channel the pressurized bypass fan air through the bearings 23 and 24. Enough air in tubes 47 with a large enough diameter are used to provide adequate flow of cooling air through the bearings. In order to allow for longer use of the engine, the bearings can be coated with tungsten disulfide to make the bearing surface harder and last longer.

The turbofan engine operates such that the duct nozzle velocity to core nozzle velocity ratio is high, or an unmixed flow turbo fan engine. This high ratio provides the necessary pressure differential between the bypass fan air pressure and the turbine nozzle exhaust pressure to drive the cooling air through the bearings.

Since the aircraft with the small single use gas turbine engine carries a fuel supply onboard, use of the fuel mist to cool and lubricate the bearings does not require any additional systems that would add weight and size to the engine while providing for longer life of the engine.

We claim the following:

1. A small single use twin spool gas turbine engine comprising:

an outer rotor shaft with a compressor on the front end and a first turbine blade on the rear end;

an inner rotor shaft rotatable within the outer rotor shaft and including a fan on the front end and a second turbine blade on the rear end;

an inlet guide vane positioned between the fan and the compressor;

an outlet guide vane positioned between the first turbine blade and the second turbine blade;

a first bearing supported between the inlet guide vane and the inner rotor shaft;

a second bearing supported between the inlet guide vane and the outer rotor shaft;

a third bearing supported between the outlet guide vane and the outer rotor shaft;

a fourth bearing supported between the outlet guide vane and the inner rotor shaft; and, means to divert a portion of the bypass fan air through the third and fourth bearings to provide cooling for the bearings.

2. The small single use gas turbine engine of claim 1, and further comprising:

the means to divert a portion of the bypass fan air comprises a plurality of air in tubes, each tube passing through a second stage turbine vane such that the cooling air passes through the third bearing before passing through the fourth bearing.

3. The small single use gas turbine engine of claim 2, and further comprising:
the means to divert a portion of the bypass fan air comprises a gap formed between a stator vane and the compressor such that the cooling air passes through the second bearing before passing through the first bearing.

4. The small single use gas turbine engine of claim 1, and further comprising:
the means to divert a portion of the bypass fan air comprises a gap formed between a stator vane and the compressor such that the cooling air passes through the second bearing before passing through the first bearing.

5. The small single use gas turbine engine of claim 1, and further comprising:
means to inject a fuel mist into the cooling air at a position upstream of the four bearings.

6. The small single use gas turbine engine of claim 2, and further comprising:
all of the guide vanes in the turbine include an air in tube to supply cooling air to the four bearings; and,
at least one of the guide vanes includes a fuel mist in tube to inject a fuel mist into the cooling air at a position upstream in the cooling air flow direction of the third bearing.

7. The small single use gas turbine engine of claim 3, and further comprising:
a plurality of air out tubes located in a first stage guide vanes and in fluid communication with the downstream end of the first bearing to remove the cooling air from the four bearings.

8. The small single use gas turbine engine of claim 7, and further comprising:
each guide vane includes one air out tube therein.

9. The small single use gas turbine engine of claim 5, and further comprising:
the means to inject a fuel mist upstream of the four bearings comprises a fuel mist in tube located between the second stage guide vane and the compressor, the fuel mist in tube opens near a location just upstream in the cooling air direction flow from the second bearing.

10. The small single use gas turbine engine of claim 9, and further comprising:
a fuel out tube located in a second stage guide vane and in fluid communication with the downstream end of the first bearing to remove the fuel mist from the first and second bearings.

11. The small single use gas turbine engine of claim 9, and further comprising:
a plurality of air out tubes located within a first stage guide vanes and in fluid communication with the downstream end of the first bearing to remove the cooling air from the first and second bearings.

12. The small single use gas turbine engine of claim 10, and further comprising:
a plurality of air out tubes located within a first stage guide vanes and in fluid communication with the downstream end of the first bearing to remove the cooling air from the first and second bearings.

13. The small single use gas turbine engine of claim 12, and further comprising:
the air out tubes and the fuel out tube are connected to a vacuum pump to suck the cooling air and the fuel from the first and second bearings.

14. The small single use gas turbine engine of claim 1, and further comprising:
the compressor is a centrifugal compressor.

15. The small single use gas turbine engine of claim 1, and further comprising:
the first and second bearings are supported by Kalrez O-rings; and,
the third and fourth bearings are supported by metal dampers.

16. The small single use gas turbine engine of claim 6, and further comprising:
the cooling air and the fuel mist passing through the third and fourth bearings passes out through a hole in a second stage turbine rotor disk and into the exhaust from the turbine.

17. The small single use twin spool gas turbine engine of claim 1, and further comprising:
the engine is an unmixed flow turbo fan using a high duct nozzle velocity to core nozzle velocity ratio.

* * * * *